US012609045B2

(12) United States Patent
Krishna Raju et al.

(10) Patent No.: US 12,609,045 B2
(45) Date of Patent: Apr. 21, 2026

(54) DYNAMICALLY INJECTING SECURITY AWARENESS TRAINING PROMPTS INTO ENTERPRISE USER FLOWS

(71) Applicant: Proofpoint, Inc., Sunnyvale, CA (US)

(72) Inventors: Sathish Krishna Raju, Milpitas, CA (US); Sriram Ganesh, Fremont, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 449 days.

(21) Appl. No.: 17/200,066

(22) Filed: Mar. 12, 2021

(65) Prior Publication Data

US 2022/0130274 A1     Apr. 28, 2022

Related U.S. Application Data

(60) Provisional application No. 63/105,618, filed on Oct. 26, 2020.

(51) Int. Cl.
| | |
|---|---|
| *G09B 19/00* | (2006.01) |
| *G09B 7/02* | (2006.01) |
| *H04L 9/40* | (2022.01) |

(52) U.S. Cl.
CPC ........... *G09B 19/0053* (2013.01); *G09B 7/02* (2013.01); *H04L 63/1416* (2013.01)

(58) Field of Classification Search
None
See application file for complete search history.

(56) References Cited

U.S. PATENT DOCUMENTS

| | | | | |
|---|---|---|---|---|
| 6,301,573 B1 * | 10/2001 | McIlwaine | ............... | G09B 5/00 |
| | | | | 706/60 |
| 7,841,008 B1 * | 11/2010 | Cole | ..................... | G06F 21/577 |
| | | | | 726/25 |
| 8,793,799 B2 * | 7/2014 | Fritzson | .................. | H04L 63/14 |
| | | | | 709/224 |

(Continued)

FOREIGN PATENT DOCUMENTS

| | | | |
|---|---|---|---|
| EP | 3156930 A1 | 4/2017 | |
| WO | WO-2022034461 A1 * | 2/2022 | ........... G06F 21/577 |

OTHER PUBLICATIONS

Walsh, "Protecting Information Assets Through Elective Computer Security Training" Science Applications International Corp (Year: 1994).*

(Continued)

*Primary Examiner* — Xuan M Thai
*Assistant Examiner* — Andrew Bodendorf
(74) *Attorney, Agent, or Firm* — Banner & Witcoff, Ltd.

(57) ABSTRACT

Aspects of the disclosure relate to dynamic cybersecurity event detection and training functions. A computing platform may monitor a plurality of user devices to detect a cybersecurity training triggering event. In response to the detection, one or more cybersecurity training session prompts may be generated and transmitted to one or more user devices. User input providing a response to the cybersecurity training session prompt may be evaluated for accuracy and scored for the cybersecurity training session. In some examples, an overall cybersecurity score for a user may be maintained and modified based on the score for the cybersecurity training session. One or more modifications may be identified and executed based on the scores generated.

21 Claims, 12 Drawing Sheets

(56) References Cited

U.S. PATENT DOCUMENTS

| | | | | |
|---|---|---|---|---|
| 8,955,109 | B1 * | 2/2015 | Satish | G06F 21/50 |
| | | | | 726/22 |
| 9,015,789 | B2 * | 4/2015 | Thomas | G06F 21/554 |
| | | | | 726/1 |
| 10,346,539 | B2 * | 7/2019 | Cecchi | G06F 16/35 |
| 10,949,760 | B1 * | 3/2021 | Kritzinger | G06N 5/04 |
| 10,970,188 | B1 * | 4/2021 | Åvist | H04L 63/1441 |
| 11,508,253 | B1 * | 11/2022 | Aloisio | G06F 3/04815 |
| 2006/0047544 | A1 * | 3/2006 | Habon | G06F 9/453 |
| | | | | 715/765 |
| 2006/0286533 | A1 * | 12/2006 | Hansen | G09B 7/02 |
| | | | | 434/323 |
| 2011/0061089 | A1 * | 3/2011 | O'Sullivan | H04L 63/102 |
| | | | | 726/1 |
| 2012/0124671 | A1 * | 5/2012 | Fritzson | H04L 63/1441 |
| | | | | 726/26 |
| 2012/0284276 | A1 * | 11/2012 | Fernando | G06F 16/41 |
| | | | | 707/741 |
| 2014/0199663 | A1 * | 7/2014 | Sadeh-Koniecpol | |
| | | | | H04L 63/1408 |
| | | | | 434/118 |
| 2014/0308646 | A1 * | 10/2014 | Wurth | G09B 7/04 |
| | | | | 434/350 |
| 2014/0329210 | A1 * | 11/2014 | Masood | G06Q 10/103 |
| | | | | 434/219 |
| 2017/0104778 | A1 * | 4/2017 | Shabtai | H04L 63/1425 |
| 2017/0244746 | A1 * | 8/2017 | Hawthorn | H04L 63/1408 |
| 2017/0304707 | A1 * | 10/2017 | Morton | G06N 3/006 |
| 2018/0075767 | A1 * | 3/2018 | Gorman | G09B 19/0053 |
| 2019/0066530 | A1 * | 2/2019 | Lee | G06F 3/00 |
| 2019/0303583 | A1 * | 10/2019 | Hosking | G09B 5/00 |
| 2020/0090127 | A1 * | 3/2020 | Masood | G09B 7/02 |
| 2021/0006584 | A1 * | 1/2021 | Basballe Sorensen | |
| | | | | G06Q 10/105 |
| 2021/0021632 | A1 * | 1/2021 | Hawthorn | G06F 21/55 |
| 2021/0029164 | A1 * | 1/2021 | Albero | H04L 63/20 |
| 2021/0082309 | A1 * | 3/2021 | Rosenberg | G09B 5/02 |
| 2021/0240836 | A1 * | 8/2021 | Hazony | G09B 5/00 |
| 2021/0390181 | A1 * | 12/2021 | McClay | G06N 20/00 |
| 2022/0005373 | A1 * | 1/2022 | Nelson | G06N 20/00 |
| 2022/0070214 | A1 * | 3/2022 | Kras | H04L 63/1483 |
| 2022/0130272 | A1 * | 4/2022 | Foroughi | G09B 7/00 |
| 2023/0308449 | A1 * | 9/2023 | Sirkin | H04L 63/102 |

OTHER PUBLICATIONS

Manke et al. "The Habits of Highly Successful Security Awareness Programs: A Cross-Company Comparison" © 2013 Secure Mentem. (Year: 2013).*

Herzberg et al. "Training Johnny to Authenticate (Safely)" Copublished by the IEEE Computer and Reliability Societies 2012 (Year: 2012).*

Nov. 8, 2021—(EP) ESR—App. No. 21174207.7.

Tam N Nguyen et al: Intellegence-based Cybersecurity Awareness Training—an Exploratory Project:, arixiv.org, Cornell University Library, 201 Olin L Ibrary Cornell University Ithaca, NY 14853, Dec. 11, 2018 (Dec. 11, 2018), XP080991512.

Jul. 9, 2025—(EP) Intention to Grant—App 21174207.7.

* cited by examiner

110

111

Cybersecurity Training Platform

Processor(s)

Memory(s)

Cybersecurity Training Event Detection Module
112a

112

Training Session Module
112b

Security Scoring Module
112c

Modification Module
112d

113

Communication Interface(s)

Internal Enterprise User Device
120

100

Internal Enterprise User Device
130

Network
190

Enterprise Operations System
140

Figures 3, 4:
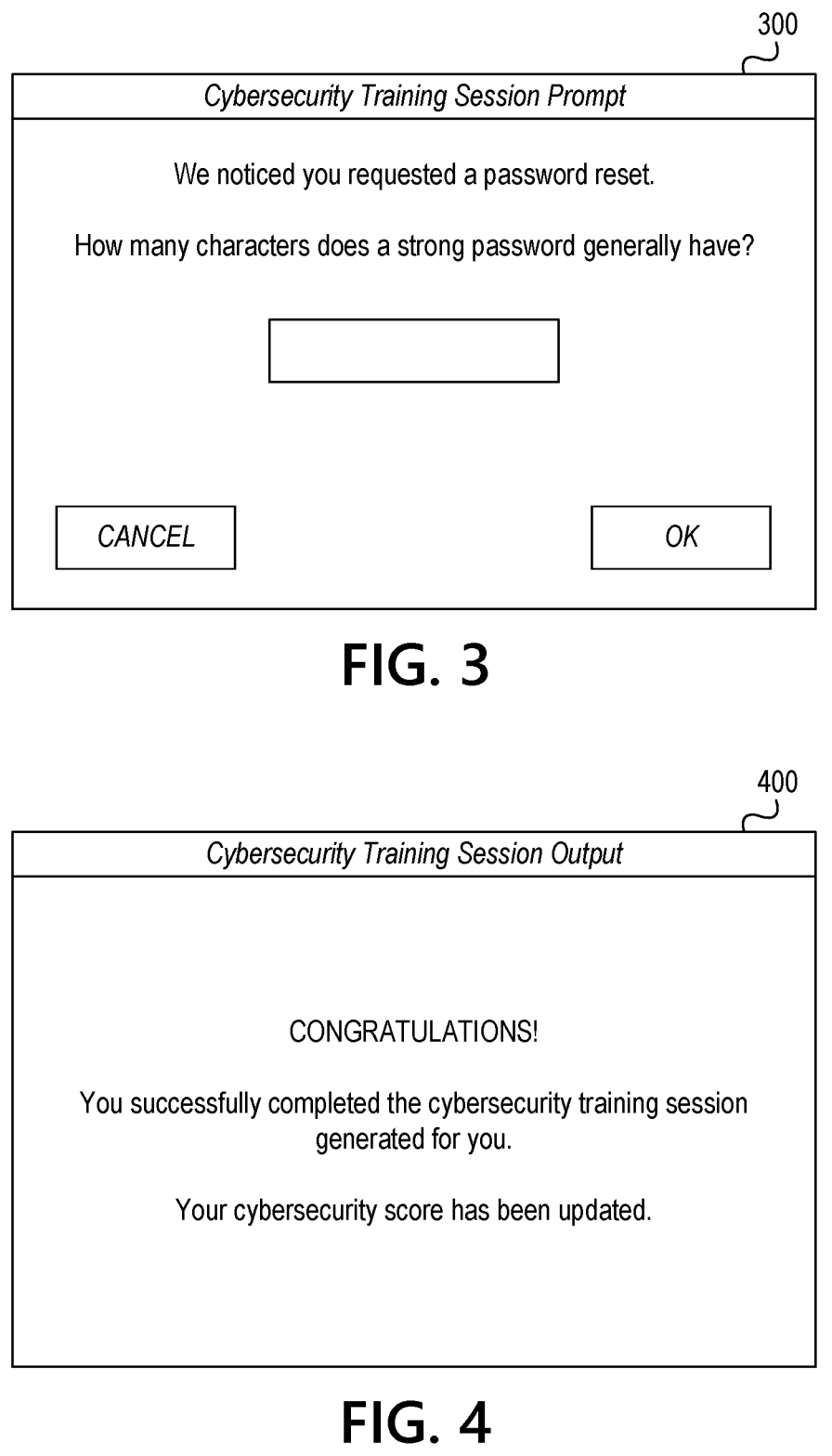

300

Cybersecurity Training Session Prompt

We noticed you requested a password reset.

How many characters does a strong password generally have?

| CANCEL | | OK |

Cybersecurity Training Session Output

CONGRATULATIONS!

You successfully completed the cybersecurity training session generated for you.

Your cybersecurity score has been updated.

| Cybersecurity Training Session Output |
|---|

Unfortunately, your response was incorrect.  Let's try another one:

How frequently does the Enterprise require you to change your password?

| CANCEL | | OK |
|---|---|---|

FIG. 5

DYNAMICALLY INJECTING SECURITY AWARENESS TRAINING PROMPTS INTO ENTERPRISE USER FLOWS

CROSS-REFERENCE TO RELATED APPLICATIONS

This application claims the benefit of and priority to U.S. Provisional Patent Application Ser. No. 63/105,618, filed Oct. 26, 2020, and entitled "Smart Security Training," which is incorporated herein by reference in its entirety.

TECHNICAL FIELD

Aspects of the disclosure relate to user device monitoring, event detection, data processing methods, and communication systems and networks. In particular, one or more aspects of the disclosure relate to detecting cybersecurity training triggering events and generating and causing execution of one or more cybersecurity training session prompts.

BACKGROUND

Increasingly, organizations face various cybersecurity threats. Accordingly, cybersecurity training has become a priority for organizations. However, conventional, lengthy training sessions can be overwhelming for users and may be ineffective. For instance, the content of standalone training modules, when deployed to users within an organization, might be cumbersome and inefficient because they might not focus on particular training issues unique to the user. Accordingly, detecting particular functions performed by a user device and deploying shorter, more interactive and targeted training sessions may improve security awareness, messaging, and retention.

SUMMARY

Aspects of the disclosure provide technical solutions that overcome one or more of the technical problems described above and/or other technical challenges. For instance, one or more aspects of the disclosure relate to detecting cybersecurity training triggering events performed by a user device and, in response, generating and transmitting targeted cybersecurity training session prompts to the user device.

In accordance with one or more embodiments, a computing platform having at least one processor, a communication interface, and memory may monitor a plurality of user devices associated with an enterprise organization. Based on the monitoring of the plurality of user devices, the computing platform may detect a cybersecurity training triggering event at a user device of the plurality of user devices of the enterprise organization. In some examples, the cybersecurity training triggering event may include a plurality of event details that may be received by the computing platform. After detecting the cybersecurity training triggering event, the computing platform may retrieve user profile data for a user. In some arrangements, the user profile data may include an overall cybersecurity score of the user and one or more user characteristics.

In some arrangements, the computing platform may then analyze the cybersecurity training triggering event and event details to identify a type of cybersecurity training triggering event. After identifying a type of cybersecurity triggering event, the computing platform may generate, based on the identified type of cybersecurity training triggering event and the user profile, a cybersecurity training session prompt and expected response data. The computing platform may then transmit, via the communication interface, the generated cybersecurity training session prompt to the user device. In some examples, transmitting the generated cybersecurity training session prompt to the user device may cause the user device to execute the generated cybersecurity training session prompt.

In some examples, the computing platform may receive, from the user device and in response to execution of the cybersecurity training session prompt, user response data received via the generated cybersecurity training session prompt. The computing platform may then compare the received user response data to the expected response data to determine whether the received user response data matches the expected response data. Based on the comparison of the user response data to the expected response data, the computing platform may compute a cybersecurity training session score associated with an outcome of the comparison. The computing platform may then update, based on the cybersecurity training session score of the outcome of the comparison, the overall cybersecurity score of the user associated with the user device.

In one or more examples, the cybersecurity training triggering event may include at least one of: launch of an application, password reset request, request to access a website, or login to a virtual private network.

In some arrangements, the cybersecurity training session prompt may include at least one targeted question generated based on the type of cybersecurity training triggering event.

In one or more embodiments, the computing platform may also compare the cybersecurity training session score associated to one or more scoring thresholds. Based on the comparison of the cybersecurity training session score to the one or more scoring thresholds, the computing platform may identify additional cybersecurity training session prompts.

In some examples, executing the cybersecurity training session prompt may cause display of one or more user interfaces associated with the cybersecurity training session prompt. Further, in some arrangements, the one or more user interfaces may include at least one field to receive user input in response to the cybersecurity training session prompt.

In one or more embodiments, the computing platform may identify, based on the cybersecurity training session score, one or more modifications to at least one of: an application or a system. The computing platform may then cause execution of the one or more modifications. In some examples, the one or more user characteristics may include a job function of the user, and the one or more modifications may be further based on the job function.

In some arrangements, the computing platform may identify, based on the updated overall cybersecurity score, one or more modifications to at least one of: an application and a system. The computing platform may then cause execution of the one or more modifications. In some examples, the one or more user characteristics may include a job function of the user, and the one or more modifications are further based on the job function.

In some embodiments, a method, performed by a computing platform having at least one processor, a memory and a communication interface, may include one or more of the steps and processes described here. Aspects may also include one or more non-transitory computer-readable media storing computer-executable instructions for performing one or more of the processes described herein, These and other aspects will be described more fully herein.

BRIEF DESCRIPTION OF THE DRAWINGS

The present disclosure is illustrated by way of example and not limited in the accompanying figures in which like reference numerals indicate similar elements and in which:

FIGS. 3-5 depict illustrative user interfaces for performing dynamic cybersecurity training event detection and cybersecurity training session prompt generation actions in accordance with one or more example embodiments.

DETAILED DESCRIPTION

Figure 1:
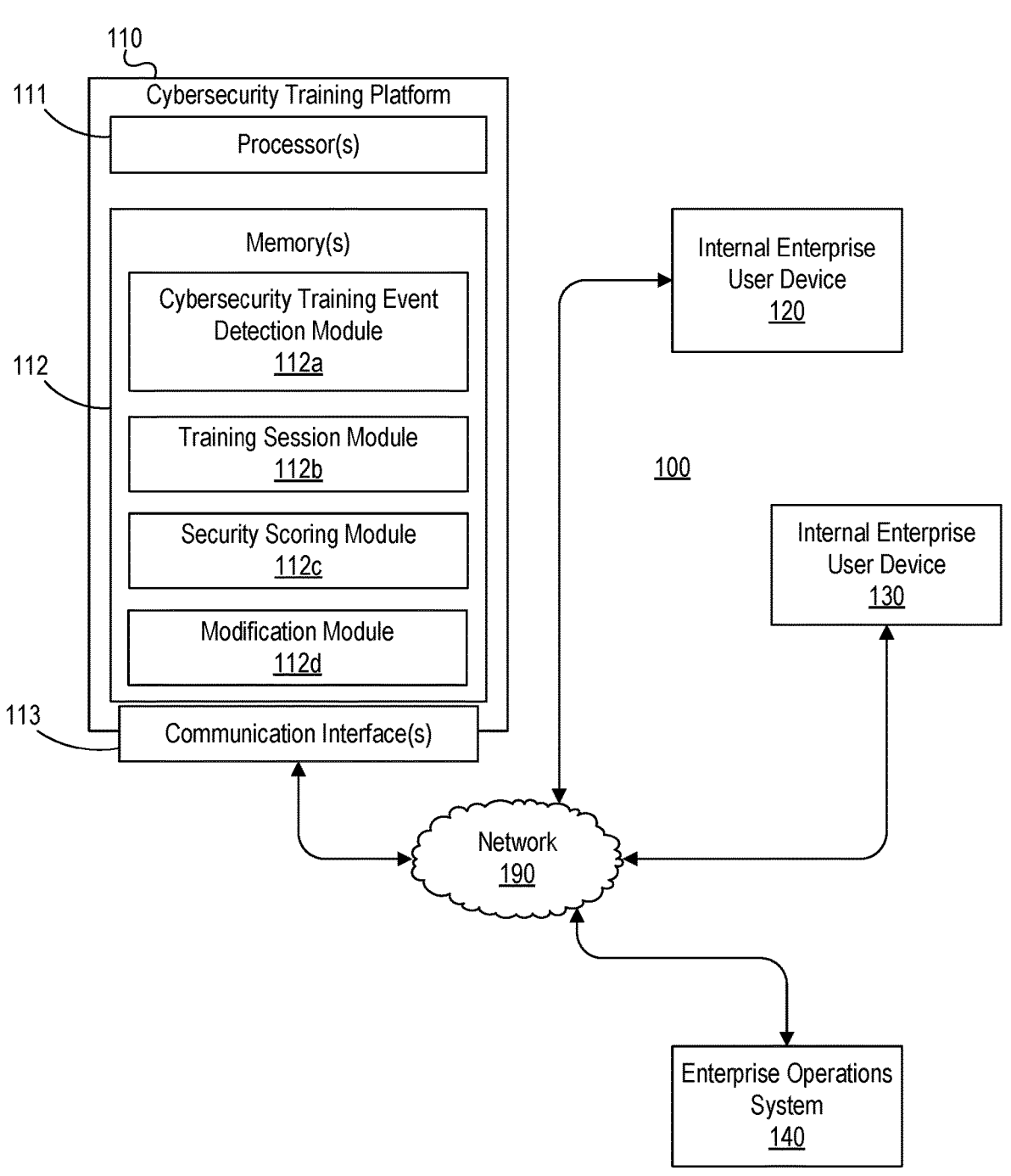
FIG. 1 depicts an illustrative operating environment for performing dynamic cybersecurity training event detection and cybersecurity training session prompt generation actions in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to improving cybersecurity training systems by providing more agile, targeted training. For instance, conventional cybersecurity training arrangements often rely on generic, computer-based training that is deployed to all employees or a subset of employees in an enterprise. However, given the range of topics encompassed by cybersecurity training, these training arrangements can be overwhelming and inefficient because they are not directed to particular issues identified for particular users.

Accordingly, rather than or in addition to providing these broad training programs, targeted, dynamic, interactive training sessions may be generated as described herein. As discussed more fully below, a computing platform may monitor a plurality of user devices within an enterprise. For instance, the system may, in some examples, monitor all user devices associated with employees of the enterprise, others who work within the enterprise or access enterprise systems, or the like. The devices may be monitored to detect one or more triggering events. For instance, actions requested by a user and executed by the computing device may be detected and identified as a cybersecurity training triggering event. The detection of the event may occur in real-time or near real-time (e.g., as the user is requesting the action) in order to quickly deploy one or more targeted training sessions.

Accordingly, upon detection of a triggering event, the computing platform may generate one or more cybersecurity training session prompts. The cybersecurity training session prompts may include one or more user interfaces including one or more questions or requests for data directed at the user associated with the device at which the triggering event was detected. In some examples, the cybersecurity training session prompt may include questions unique or specifically crafted for the user (e.g., based on user characteristics, job functions, and the like).

The generated cybersecurity training session prompt may be transmitted to the user device and executed. Execution of the cybersecurity training session prompt may cause one or more user interfaces to be displayed by the user device. The user may then provide user input in response to the question or request for data and user response data may be generated. The user response data may be compared to expected response data to determine whether the user correctly answered the question or request for data.

Based on determining whether the user answered the question correctly, a cybersecurity training session score may be generated. This score may then be used to update an overall cybersecurity score for the user. Additionally or alternatively, the cybersecurity training session score and/or overall cybersecurity score may be used to determine whether additional cybersecurity training session prompts and/or additional modifications should be executed.

Accordingly, cybersecurity training can be provided to users throughout their work day and during the course of ordinary operation of their computing devices. In providing this dynamic, targeted training system, the arrangements described herein enable customized instruction in the area of cybersecurity by detecting events as they occur and quickly and effectively providing focused training on a particular topic.

These and various other aspects will be described more fully herein.

FIG. 1 depicts an illustrative operating environment for performing dynamic cybersecurity training triggering event detection and training session generation actions in accordance with one or more example embodiments. Referring to FIG. 1, computing environment 100 may include various computer systems, computing devices, networks, and/or other operating infrastructure. For example, computing environment 100 may include a cybersecurity training platform 110, a first internal enterprise user device 120, a second internal enterprise user device 130, an enterprise operations system 140, and a network 190.

Network 190 may include one or more wired networks and/or one or more wireless networks that interconnect cybersecurity training platform 110, internal enterprise user device 120, internal enterprise user device 130, enterprise operations system 140, and/or other computer systems and/or devices. In addition, each of cybersecurity training platform 110, internal enterprise user device 120, internal enterprise user device 130, and/or enterprise operations system 140, may be special purpose computing devices configured to perform specific functions, as illustrated in greater detail below, and may include specific computing components such as processors, memories, communication interfaces, and/or the like.

Cybersecurity training platform 110 may include one or more processor(s) 111, one or more memory(s) 112, and one or more communication interface(s) 113. In some instances, cybersecurity training platform 110 may be made up of a plurality of different computing devices, which may be distributed within a single data center or a plurality of different data centers. In these instances, the one or more processor(s) 111, one or more memory(s) 112, and one or more communication interface(s) 113 included in cybersecurity training platform 110 may be part of and/or otherwise associated with the different computing devices that form cybersecurity training platform 110.

In one or more arrangements, processor(s) 111 may control operations of cybersecurity training platform 110. Memory(s) 112 may store instructions that, when executed by processor(s) 111, cause cybersecurity training platform 110 to perform one or more functions, as discussed below. Communication interface(s) 113 may include one or more wired and/or wireless network interfaces, and communication interface(s) 113 may connect cybersecurity training platform 110 to one or more networks (e.g., network 190) and/or enable cybersecurity training platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause cybersecurity training platform 110 to perform various functions) and/or databases (which may, e.g., store data used by cybersecurity training platform 110 in performing various functions). For example, memory(s) 112 may store and/or otherwise provide cybersecurity training event detection module 112a, training session module 112b, security scoring module 112c, and modification module 112d. In some instances, cybersecurity training event detection module 112a may store instructions that cause cybersecurity training platform 110 to monitor (e.g., on a continuous or periodic basis) one or more internal enterprise user devices, such as internal enterprise user device 120, internal enterprise user device 130, or the like, for detection of one or more cybersecurity training triggering events or opportunities. For instance, some example cybersecurity training triggering events or opportunities may include a request to change or reset a password, switching between applications executing on the device, opening an application, opening an email inbox, an attempt to access one or more uniform resource locators (URLs) that have been identified as potentially malicious, an attempt to login to a virtual private network (VPN), a first login to a particular computing device or an application (e.g., as a new user), a login attempt at a computing device or application after an extended time period (e.g., predetermined period of time) in which no logins were attempted, a request to access a link from an unsecure browser session, and the like. Further, training session module 112b may store data and/or instructions that may be used by cybersecurity training platform 110 to generate, based on event details associated with a detected cybersecurity training triggering event or opportunity, one or more cybersecurity training sessions and associated expected responses data. The generated cybersecurity training sessions may include one or more user interfaces or prompts that may be transmitted to a user device, such as internal enterprise user device 120 and/or internal enterprise user device 130 for display. In addition, security scoring module 112c may store instructions and/or data that may be used by cybersecurity training platform 110 to apply a cybersecurity scoring process to data received in response to the cybersecurity training session. Modification module 112d may store instructions and/or data that may be used by cybersecurity training platform 110 to identify additional modifications to applications, devices, accessibility permissions, and the like, based on the cybersecurity scoring process.

Internal enterprise user device 120 and/or internal enterprise user device 130 may be configured to be used by a user (who may, e.g., be an employee of an enterprise organization). In some instances, internal enterprise user device 120 and or internal enterprise user device 130 may be configured to perform various functions based on user data requests, user input, or the like, that may be detected as a cybersecurity training triggering event. Internal enterprise user device 120 and/or internal enterprise user device 130 may also present one or more cybersecurity training session user interfaces or prompts, receive user input in response to the cybersecurity training session user interfaces or prompts, and the like.

Enterprise operations system 140 may be and/or include one or more computing devices (e.g., servers, server blades, enterprise devices, or the like) that may be configured to host one or more enterprise systems, applications, or the like. The enterprise applications, systems, and the like may be accessed by various internal enterprise user devices, such as internal enterprise user device 120, internal enterprise user device 130, or the like. Enterprise operations system 140 may, in some instances, store user profile data including cybersecurity score data associated with a plurality of users (e.g., employees of the enterprise organization). In some examples, enterprise operations system 140 may be configured to receive commands from cybersecurity training platform 110 and to modify and/or update accessibility preferences, user permissions, and the like.

FIGS. 2A-2H depict an illustrative event sequence for performing dynamic cybersecurity training event detection and training session generation actions in accordance with one or more example embodiments. The sequence illustrated in FIGS. 2A-2H is merely one example sequence and various other events may be included, or events shown may be omitted, without departing from the invention.

Figure 2A:
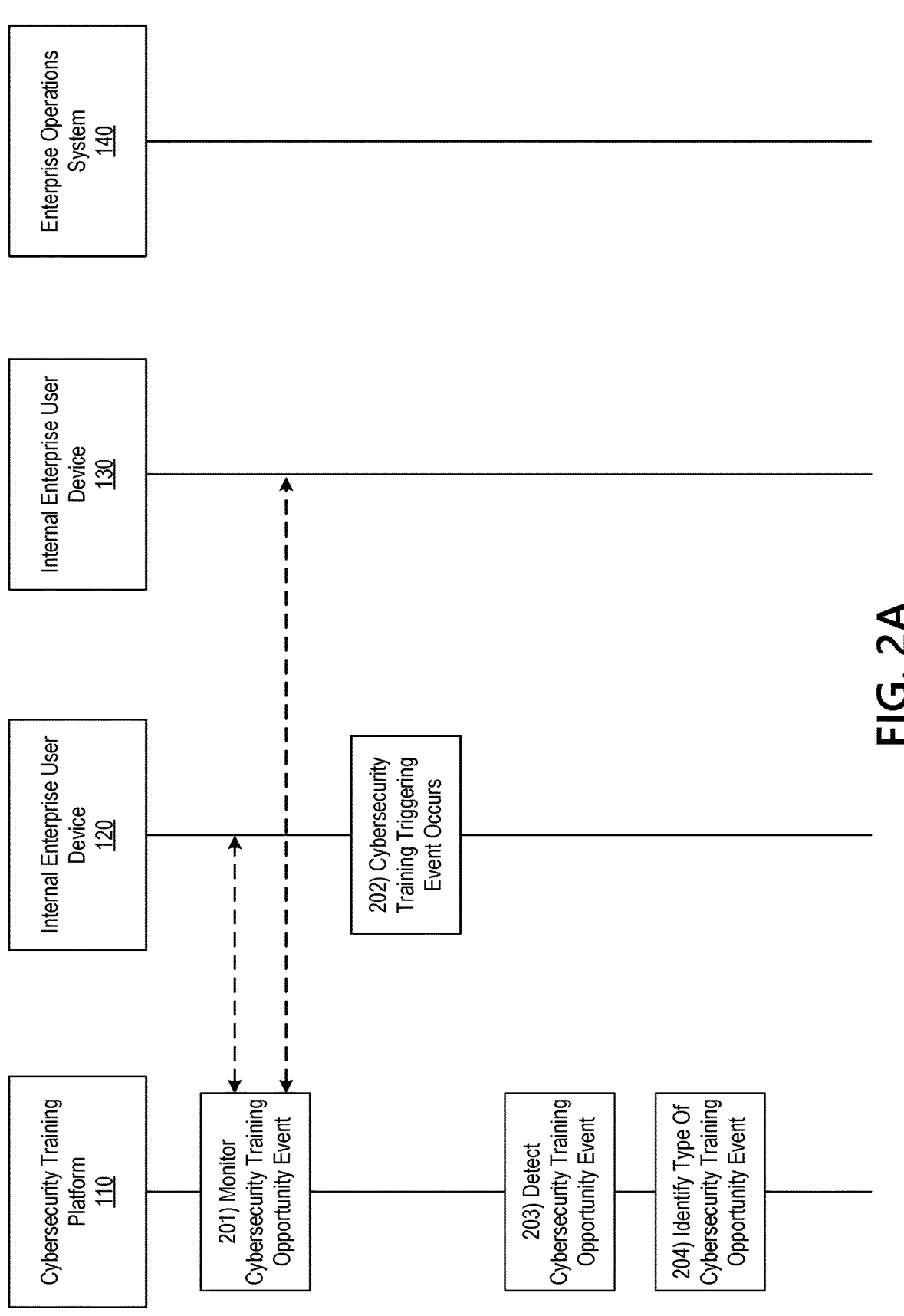
FIGS. 2A-2H depict an illustrative event sequence for performing dynamic cybersecurity training event detection and cybersecurity training session prompt generation actions in accordance with one or more example embodiments.

Referring to FIG. 2A, at step 201, cybersecurity training platform 110 may monitor processes and/or functions executed by or requested at one or more internal enterprise user devices, such as internal enterprise user device 120, internal enterprise user device 130, or the like. For example, cybersecurity training platform 110 may monitor a plurality of internal enterprise user devices (e.g., continuously) to identify applications being launched, systems being accessed, data or connections being requested, and the like, in order to detect a cybersecurity training triggering event or opportunity.

At step 202, a cybersecurity training triggering event or opportunity may occur at one or more internal enterprise user device(s). In some arrangements, cybersecurity training platform 110 may monitor a plurality of internal enterprise user devices simultaneously or near-simultaneously, and may detect more than one triggering event occurring at different internal enterprise user devices. Accordingly, cybersecurity training platform 110 may process, in parallel, one or more triggering events to generate appropriate training sessions, evaluate response data, and the like.

In some arrangements, a cybersecurity training triggering event or opportunity may include a first login attempt by a user to a device, application, system, or the like. For instance, a new employee or new user of a device, system, application, or the like, may attempt a first login and, upon attempting the login, a triggering event may be detected. In some examples, the cybersecurity training platform 110 may identify a triggering event based on an employee having a new role within the enterprise organization (e.g., a change of jobs), based on an attempt to access a system, application, and/or device after an extended period without any login attempts (e.g., after a predetermined time period since the last login attempt has elapsed), or the like.

Additionally or alternatively, a cybersecurity training triggering event or opportunity may include a request to access a URL, email or the like that is suspicious (e.g., as determined from previous access, from third party reports of suspicious URLs, or the like). In some examples, a cybersecurity training triggering event or opportunity may include an attempt to access or login to a virtual private network (VPN), an attempt to reset or change a password, an attempt to open an application, an attempt to access an inbox, or the like.

The occurrence of the cybersecurity training triggering event or opportunity at step 202 may be detected by the cybersecurity training platform 110 at step 203 (e.g., via the continuous monitoring). Detecting the cybersecurity training triggering event or opportunity may include receiving event details associated with the triggering event. In some examples, event details may include a user or user identifier associated with the triggering event, a device identifier associated with the triggering event, a system, application or device to which a login is being attempted, a function requested or attempted, and the like.

At step 204, the detected cybersecurity training triggering event and associated details may be analyzed to determine a type of triggering event. For instance, one or more types of events may be extracted from event details captured when the triggering event was detected. In some examples, if a new user is detected, the triggering event type may include "new user." In another example, if the triggering event included an attempt to access potentially malicious content via a URL or email, the triggering event type may include "suspicious content." Various other types or categories of events may be used without departing from the invention.

Figure 2B:
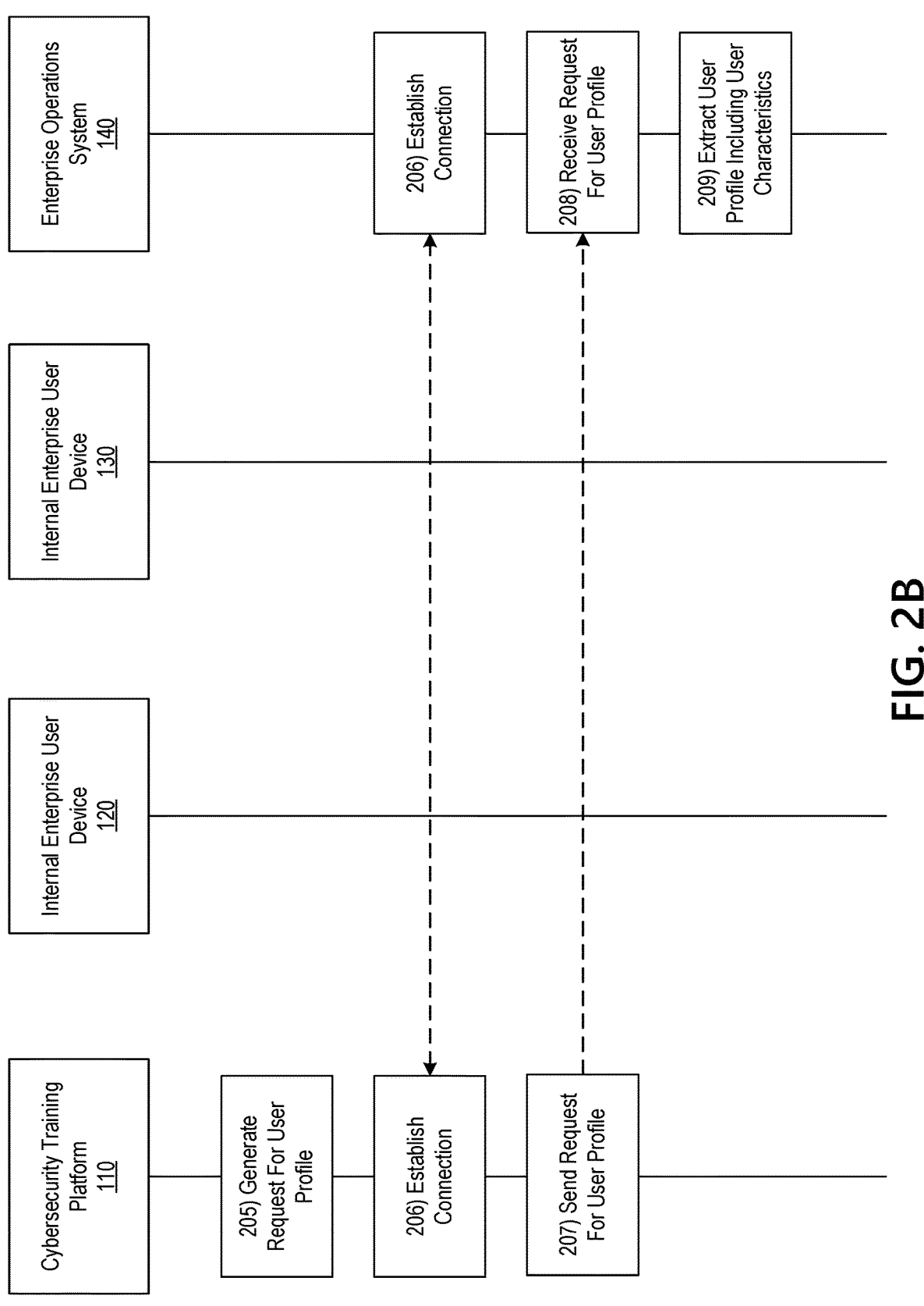

With reference to FIG. 2B, at step 205, a request for a user profile may be generated by the cybersecurity training platform 110. For instance, based on the event details received by the cybersecurity training platform 110, a request for a user profile associated with a user causing the triggering event (e.g., attempting a login, requesting access to a website, or the like) may be generated.

At step 206, a connection may be established between the cybersecurity training platform 110 and enterprise operations system 140. For instance, a first wireless connection may be established between cybersecurity training platform 110 and enterprise operations system 140. Upon establishing the first wireless connection, a communication session may be initiated between enterprise operations system 140 and cybersecurity training platform 110.

At step 207, the generated request for the user profile may be transmitted from cybersecurity training platform 110 to enterprise operations system 140. For instance, the request for the user profile may be transmitted during the communication session initiated upon establishing the first wireless connection.

At step 208, the request for user profile may be received by enterprise operations system 140 and, at step 209, the requested user profile, including one or more user characteristics, may be extracted or retrieved.

Figure 2C:
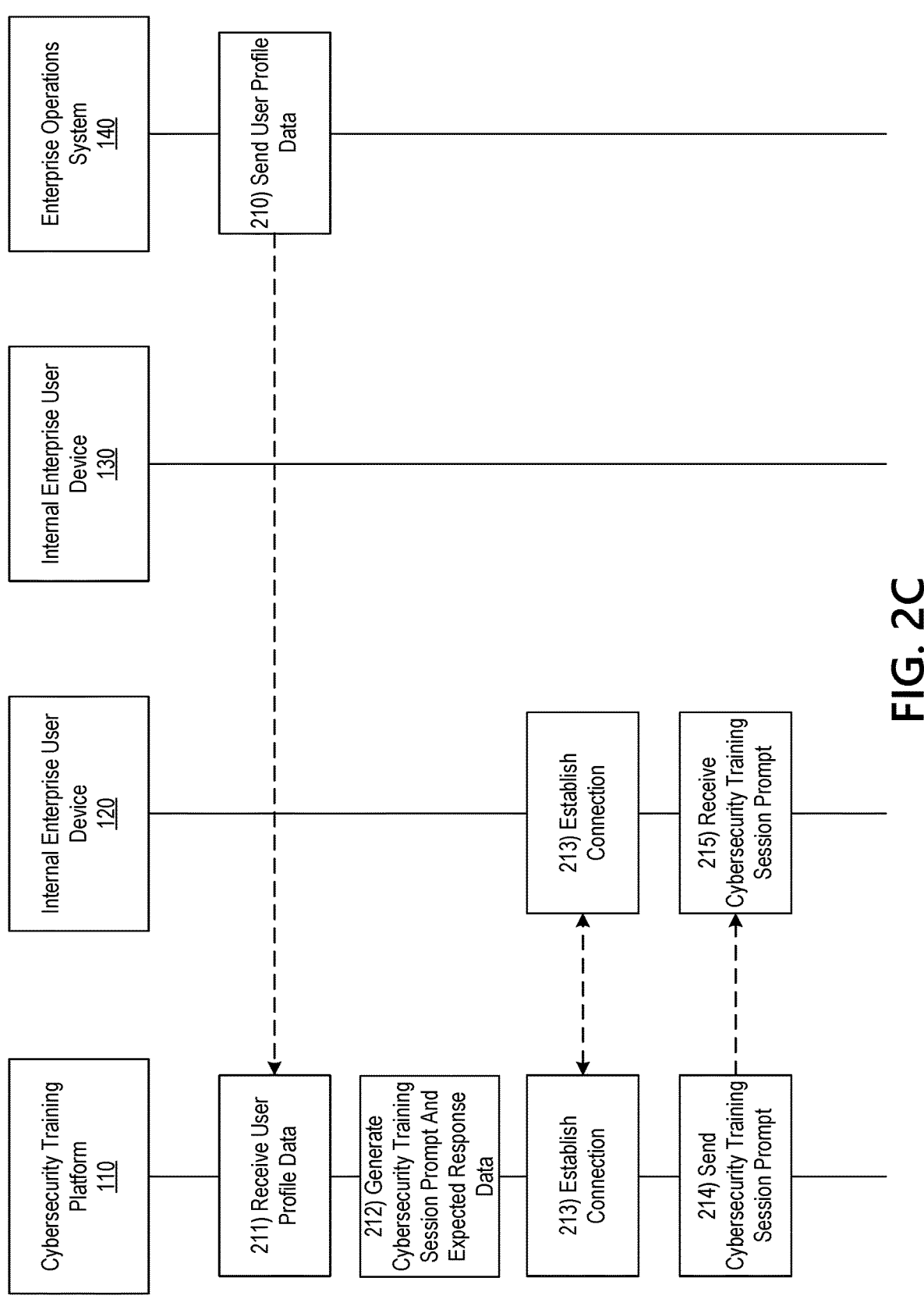

With reference to FIG. 2C, at step 210, the user profile data may be transmitted from enterprise operations system 140 to cybersecurity training platform 110. In some examples, the user profile data may be transmitted during the communication session initiated upon establishing the first wireless connection. At step 211, the user profile data may be received by cybersecurity training platform 110. In some arrangements, the user profile data may include user characteristics including data associated with the user (e.g., name or unique identifier, role within the enterprise or key job functions (e.g., is the user a very attacked person, a high level executive, a person with access to multiple systems or types of data), and the like), device(s) associated with the user, previous cybersecurity training results or records for the user, identified strengths or weaknesses of the user, and the like. The user profile data may also include an overall cybersecurity score for the user. The overall cybersecurity score may be based on a plurality of cybersecurity scores (e.g., cybersecurity training session scores) generated in response to cybersecurity training sessions completed by the user (e.g., the overall score may be a sum or average of the scores of each individual cybersecurity training session).

At step 212, a cybersecurity training session prompt, and expected response data, may be generated. For instance, based on the identified type of cybersecurity training triggering event, and/or any additional event details, user details, and the like, a cybersecurity training session prompt may be generated. In some examples, the cybersecurity training session prompt may include one or more questions to be presented to the user (e.g., the user associated with the device at which the triggering event was detected). The one or more questions may be general cybersecurity training questions, may be specific to the triggering event detected, and/or may be specific to the user or device. In some examples, the one or more questions may be identified or selected from a list of pre-generated questions for a particular type of event. Additionally or alternatively, the one or more questions may be identified or selected based, at least in part, on user characteristics found in the user profile. In some examples, the cybersecurity training session prompt may include a series of questions that, in some instance, may be answered sequentially. Some example cybersecurity training session prompts may include a simulated threat (e.g., simulated malicious URL, simulated malicious email, or the like). Generating the cybersecurity training session prompt may include generating one or more user interfaces that may be displayed by a user device, such as internal enterprise user device 120.

For instance, FIG. 3 illustrates one example user interface that may be generated with the cybersecurity training session prompt. The interface 300 includes identification of the triggering event (e.g., request for password reset), as well as cybersecurity training question displayed to the user. The user interface 300 may further include a field to receive user input in response to the cybersecurity training question. Once the user has provided a response, the user may select "OK" option to process the response. Alternatively, the user may select "CANCEL" option. However, selecting the "CANCEL" option may cause this or another cybersecurity training session prompt to be generated and/or displayed at a later time.

In addition to generating the cybersecurity training session prompt, expected response data may also be generated. For instance, if the cybersecurity training session prompt includes one or more questions to be displayed to the user, an expected (e.g., correct or acceptable) response to each question may also be generated by the cybersecurity training platform 110. This expected response data may then be compared to user response data to generate a cybersecurity score for the user.

At step 213, a connection may be established between the cybersecurity training platform 110 and internal enterprise user device 120 (e.g., the device at which the triggering event was detected). For instance, a second wireless connection may be established between cybersecurity training platform 110 and internal enterprise user device 120. Upon establishing the second wireless connection, a communication session may be initiated between internal enterprise user device 120 and cybersecurity training platform 110.

At step 214, the generated cybersecurity training session prompt may be transmitted from cybersecurity training platform 110 to internal enterprise user device 120. For instance, the generated cybersecurity training session prompt may be generated during the communication session initiated upon establishing the second wireless connection.

At step 215, the generated cybersecurity training session prompt may be received by internal enterprise user device 120.

Figure 2D:
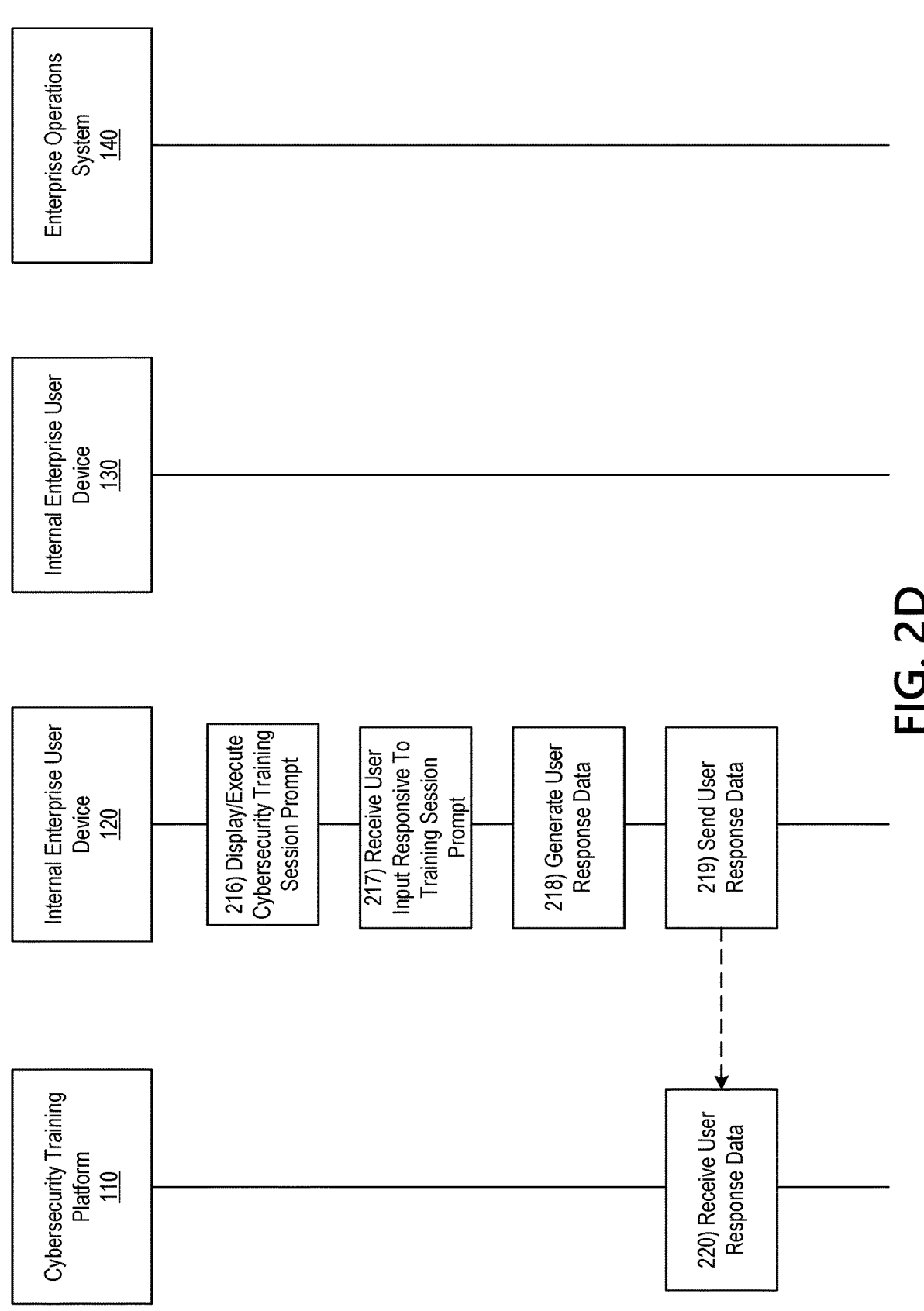

With reference to FIG. 2D, at step 216, the cybersecurity training session prompt may be displayed and/or executed by internal enterprise user device 120. For instance, the cybersecurity training prompt may include an instruction or command causing execution of the cybersecurity training session prompt and display of one or more user interfaces associated with the cybersecurity training session prompt.

At step 217, user input may be received by internal enterprise user device 120 in response to the cybersecurity training session prompt. For instance, in response to execution of the cybersecurity training session prompt and/or display of associated user interfaces, user input may be received (e.g., via the user interface displaying the cybersecurity training session prompt) providing a user response to the cybersecurity training session prompt (e.g., an answer to one or more questions, or the like).

Based on the received user input, at step 218, user response data may be generated by internal enterprise user device 120. At step 219, the generated user response data may be transmitted from internal enterprise user device 120 to cybersecurity training platform 110. In some examples, the user response data may be transmitted during the communication session initiated upon establishing the second wireless connection. At step 220, the user response data may be received by cybersecurity training platform 110.

Figure 2E:
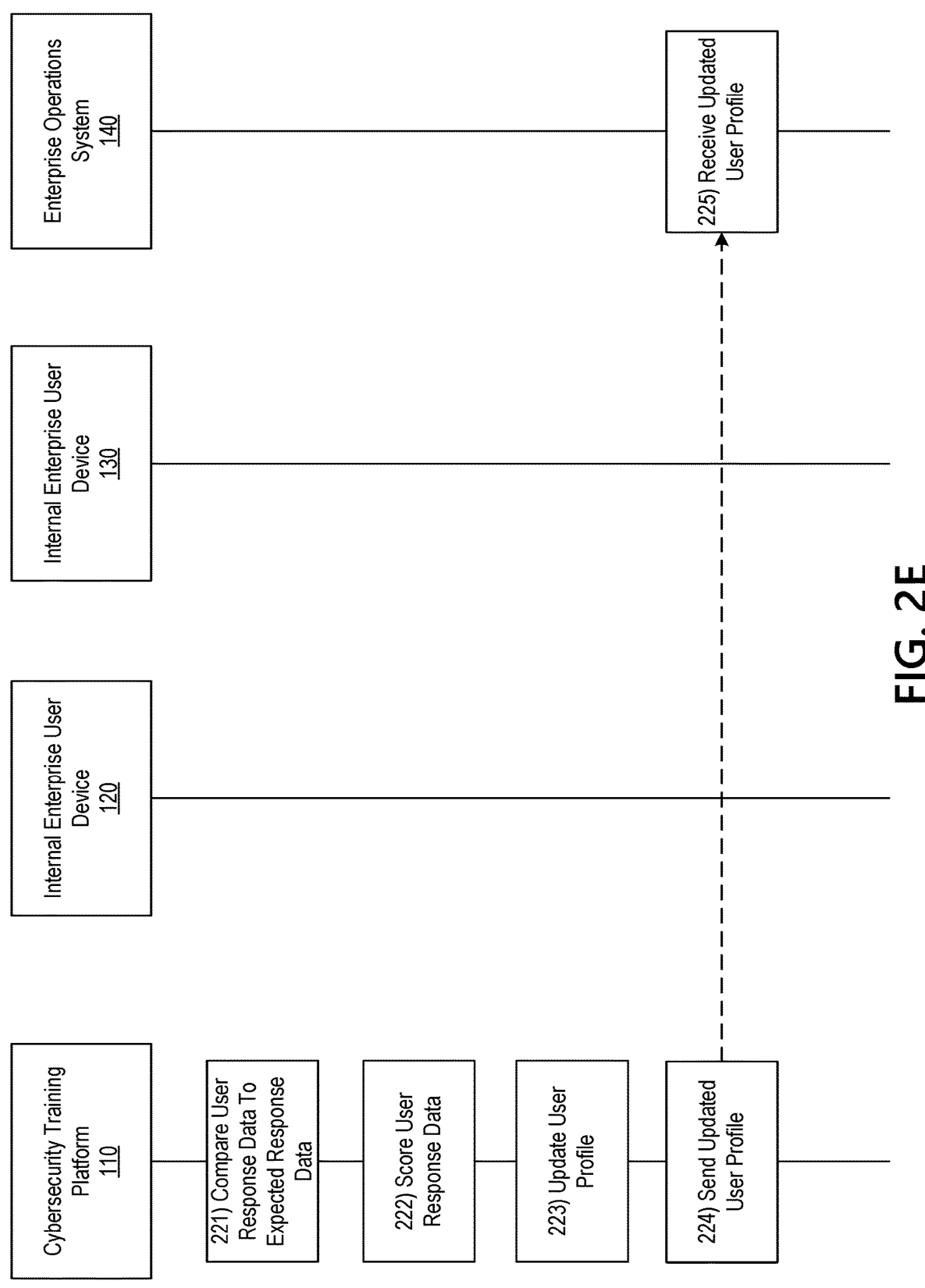

With reference to FIG. 2E, at step 221, the received user response data may be compared to the generated expected response data by cybersecurity training platform 110. For instance, the received user response data may be compared to the generated expected response data to determine whether there is a match (e.g., whether the question was answered correctly). In some examples, a match may include an exact match between the user response data and the expected data. Additionally or alternatively, a match may include at least a threshold similarity between the user response data and the expected response data (e.g., at least a threshold number of characters match).

At step 222, cybersecurity training platform 110 may apply a cybersecurity scoring process to a result of the comparison between the user response data and the expected response data. For instance, a cybersecurity scoring process may evaluate results of the comparison to determine an accuracy of the user response data (e.g., based on how well the user response data matches the expected response data) to determine a cybersecurity training session score. In some examples, a binary output of "matching" or "not matching," may be generated based on the comparison and a score may be generated based on the binary output. In other examples, a confidence value or percentage of a likely match may be determined based on the comparison and a score may be generated based on the confidence value or percentage of a likely match. In some examples, the cybersecurity training session score may be value between 0 and 10, 0 and 100, or the like. In some arrangements, a weighting value may be applied to the cybersecurity training session score (e.g., based on a risk level associated with a triggering event, based on accessibility permissions associated with the user or user role within the enterprise organization, or the like).

At step 223, the user profile received may be updated based on the generated cybersecurity training session score. For instance, cybersecurity training platform 110 may update the user profile to reflect the cybersecurity training session provided to the user, as well as the corresponding cybersecurity training session score. Further, an overall cybersecurity score of the user stored in the user profile may be updated based on the generated cybersecurity training session score. For instance, an overall cybersecurity score for the user may be computed or calculated based on a previous overall cybersecurity score and the current cybersecurity training session score. In some examples, computing the overall cybersecurity training session score may include determining an average of all scores associated with cybersecurity training sessions, determining a sum of all scores associated with cybersecurity training sessions, and the like.

FIG. 4 illustrates one example user interface 400 that may be generated and transmitted to internal enterprise user device 120 in response to determining that the user response data matches the expected response data. The user interface 400 may provide an indication of successful completion of the cybersecurity training session, as well as an indication that an overall cybersecurity score has been updated.

At step 224, the updated user profile may be transmitted from the cybersecurity training platform 110 to the enterprise organization system. In some examples, the updated user profile may be transmitting during a communication session previously initiated upon establishing a wireless connection. In other examples, if a wireless connection is no longer established, another wireless connection may be established and communication session initiated.

At step 225, the updated user profile may be received by the enterprise operations system 140.

Figure 2F:
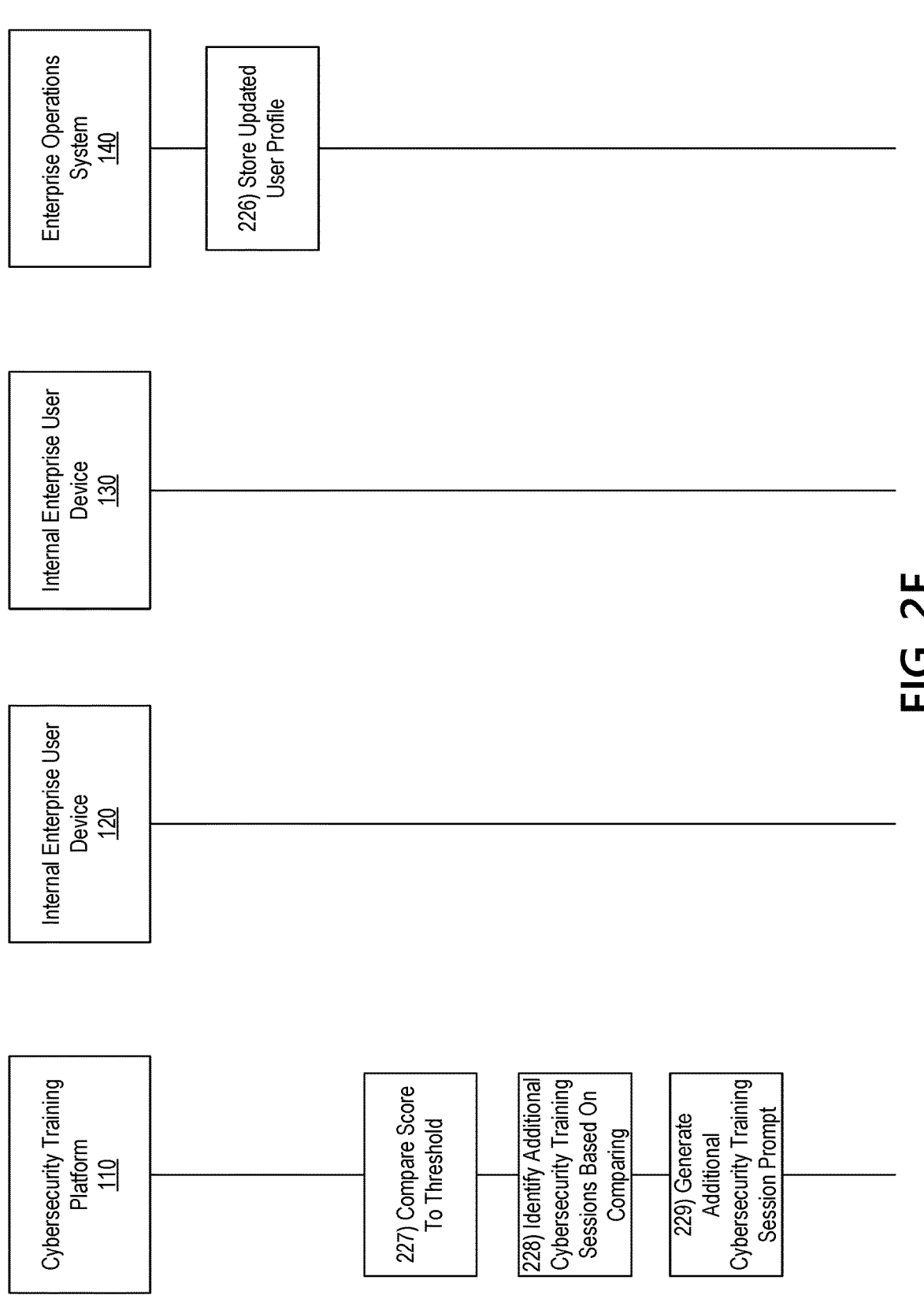

With reference to FIG. 2F, at step 226, the updated user profile may be stored by the enterprise operations system 140.

At step 227, cybersecurity training platform 110 may compare the cybersecurity training session score and/or overall cybersecurity score for the user to one or more training thresholds. For instance, one or more training thresholds may be identified that indicate a level of risk associated with users. For instance, if a cybersecurity training session score and/or overall cybersecurity score is above a first threshold, the user may be performing as expected and risk may be low. If a cybersecurity training session score and/or overall cybersecurity score is above a second threshold but below the first threshold, the user may have a moderate risk level and one or more additional training sessions may be identified for the user. If a cybersecurity training session score and/or overall cybersecurity score is below the second threshold, the user may present a high risk and remedial cybersecurity training may be identified for the user. Although three groupings and two thresholds are provided in this example, various other threshold arrangements may be used without departing from the invention. In some examples, the threshold values may vary based on different factors. For instance, threshold values for a user having far-reaching access to data within the enterprise may be different from threshold values for a user having limited data access.

At step 228, based on comparing one or more of the cybersecurity training session score and/or overall cybersecurity score to one or more thresholds, additional cybersecurity training sessions may be identified by cybersecurity training platform 110 for the user. For instance, in continuing the example above, if the cybersecurity training session score is between the second threshold and the first threshold, one or more additional training sessions (e.g., directed to a same type of triggering event, directed to related triggering events, or the like) may be identified. If the overall cybersecurity score is between the second threshold and the first threshold, in some examples, additional overall cybersecurity training sessions may be identified for the user (e.g., covering a broader range of cybersecurity topics or areas).

In some arrangements, a more robust cybersecurity training program (e.g., multi-session, or the like) may be identified for the user.

At step 229, based on the identified additional cybersecurity training sessions, one or more additional cybersecurity training session prompts may be generated, as well as expected response data associated with the additional cybersecurity training session prompt. The additional cybersecurity training session prompt(s) and associated expected response data may be generated similarly to those generated at step 212.

For instance, FIG. 5 illustrates one example user interface 500 that may be generated with an additional cybersecurity training session prompt. The user interface 500 includes an indication that the user was not successful in the previous session and includes another question for the user to answer. In addition, the interface 500 includes a field to receive user input in response to the questions, as well as selectable options to process the user input (e.g., "OK") or cancel (e.g., "CANCEL").

Figure 2G:
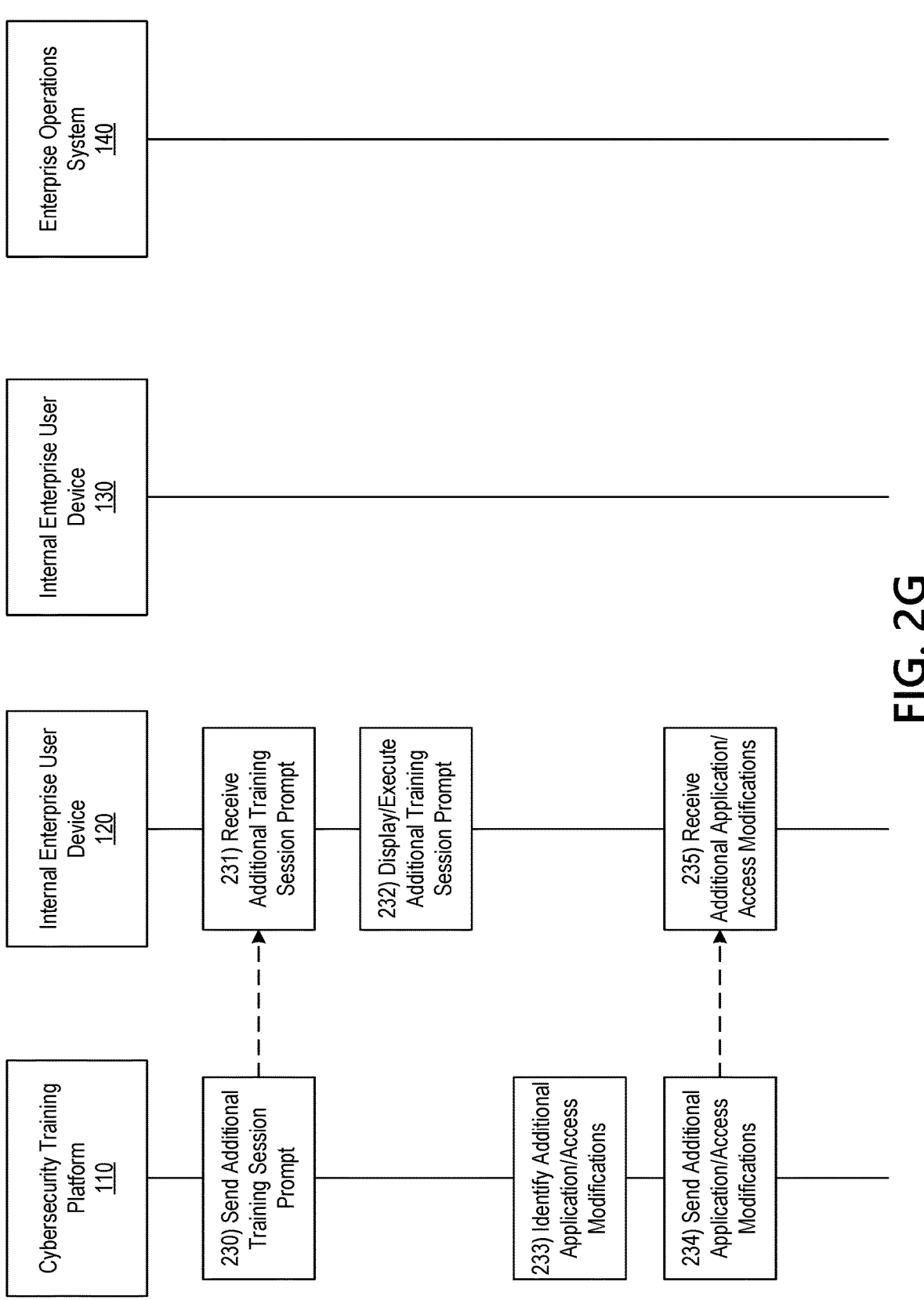

With reference to FIG. 2G, at step 230, the generated additional cybersecurity training session prompt may be transmitted from the cybersecurity training platform 110 to the internal enterprise user device 120. In some examples, the additional cybersecurity training session prompt may be transmitted during a communication session initiated with a previously established wireless connection. Alternatively, if a wireless connection is not established, a wireless connection may be established, a communication session initiated and the generated additional cybersecurity training session prompt may be transmitted.

At step 231, the additional cybersecurity training session prompt may be received by the internal enterprise user device 120.

At step 232, the additional cybersecurity training session prompt may be displayed and/or executed by the internal enterprise user device 120. For instance, the additional cybersecurity training session prompt may include instructions or commands causing the internal enterprise user device 120 to display and/or execute the additional cybersecurity training session prompt. Similar to other arrangements described herein, user input may be received and user response data may be generated based on the user input. The user response data may be transmitted from the internal enterprise user device 120 to the cybersecurity training platform 110 for comparison with the expected response data, further scoring, and the like.

At step 233, based on the cybersecurity training session score and/or the overall cybersecurity score, cybersecurity training platform 110 may identify one or more additional application and/or access modifications. For instance, based on one or more of the cybersecurity training session score and/or the updated overall score, one or more modifications to an application, access permission, or the like, associated with the user, may be identified. In some examples, the application, access permission, or the like, may be related to the detected triggering event. Additionally or alternatively, the modifications may be made to applications, permissions, and the like, that are unrelated to the triggering event detected. Accordingly, in one example, if a request to change a password for a first system is a detected triggering event, and the user selects a password that is considered "weak" (e.g., the minimum number of characters, few non-alphanumeric characters, or the like), the user may be prompted with a cybersecurity training session prompt in response to the password change for the first system. A cybersecurity training session score may be generated and the overall cybersecurity score of the user may be modified. If the overall score is modified by a threshold amount, to be lower than a previous value, or the like, additional cybersecurity training session prompts or modifications to a user's access to data, systems, or the like, associated with other systems (e.g., systems other than the first system) may be identified. Modifications may include more frequent password change requirements, reduced accessibility to data, and the like. In some arrangements, tighter controls for user devices associated with the user may be identified. For instance, if a browser issue is a triggering event, the additional controls may be identified causing links selected by the user to be opened in isolation. Various other example modifications may be identified without departing from the invention.

At step 234, if the identified modification to an application or access will be executed by a user device, such as internal enterprise user device 120, the identified modification may be transmitted from the cybersecurity training platform 110 to the internal enterprise user device 120. In some examples, the modification may be transmitted via a previously initiated communication session. Alternatively, if a communication session is not established, a wireless connection may be established and communication session initiated in order to transmit the identified modifications.

At step 235, the modifications may be received by the internal enterprise user device 120 and executed by the device.

Figure 2H:
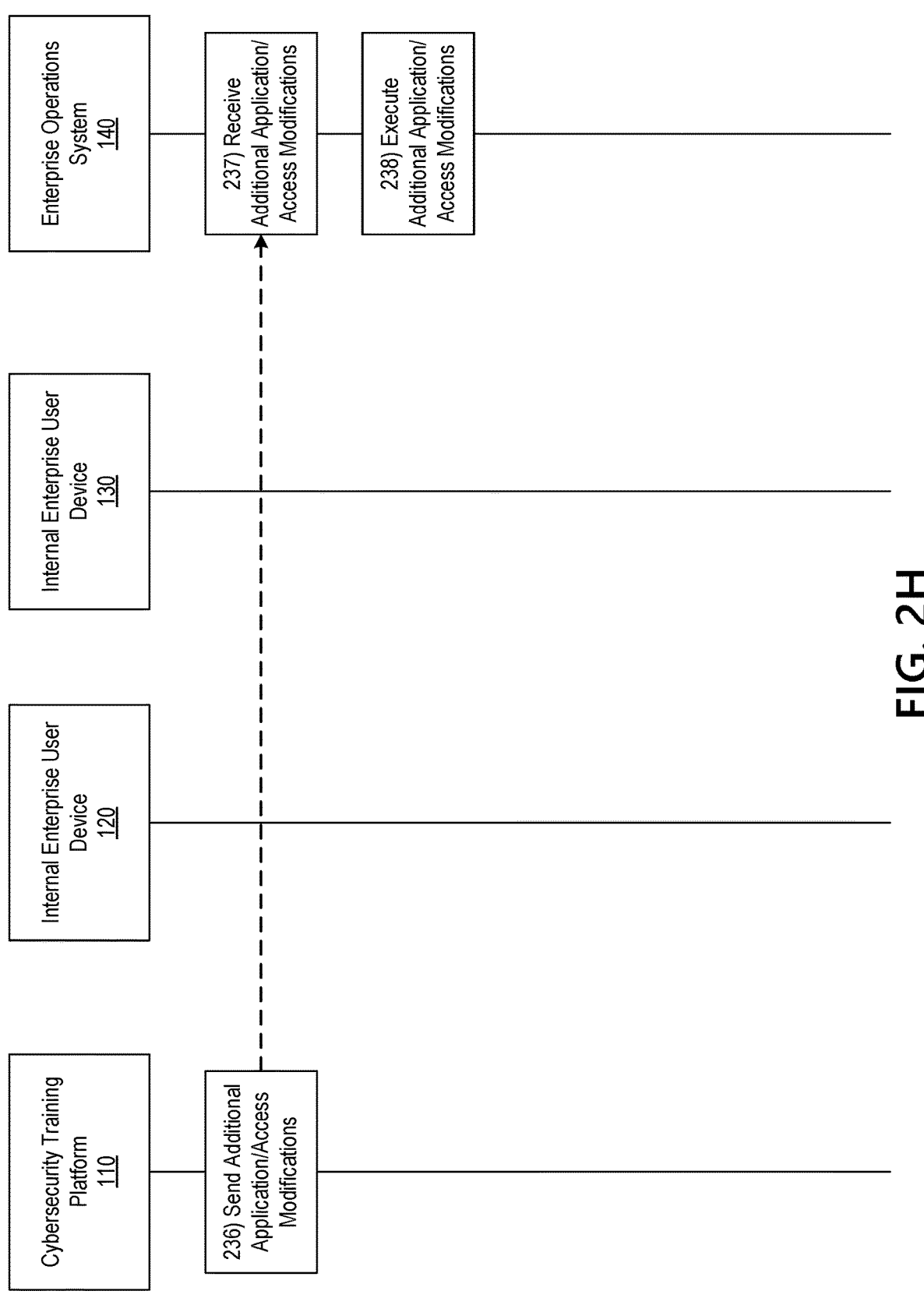

With reference to FIG. 2H, at step 236, if the identified modifications to an application or access will be executed by one or more enterprise systems (e.g., enterprise operations system 140) the identified modifications may be transmitted from the cybersecurity training platform 110 to the enterprise operations system 140. In some examples, the modifications may be transmitted during a previously established communication session. Alternatively, if a wireless connection or communication session is not established, a connection and communication session may be established and the identified modifications transmitted.

At step 237, the one or more modifications may be received by the enterprise operations system 140.

At step 238, the one or more modifications may be executed by the enterprise operations system 140. For instance, the one or more modifications may include an instruction or command causing execution of the identified modification (e.g., changes in accessibility or permissions, changes in controls executed, and the like).

Figure 6:
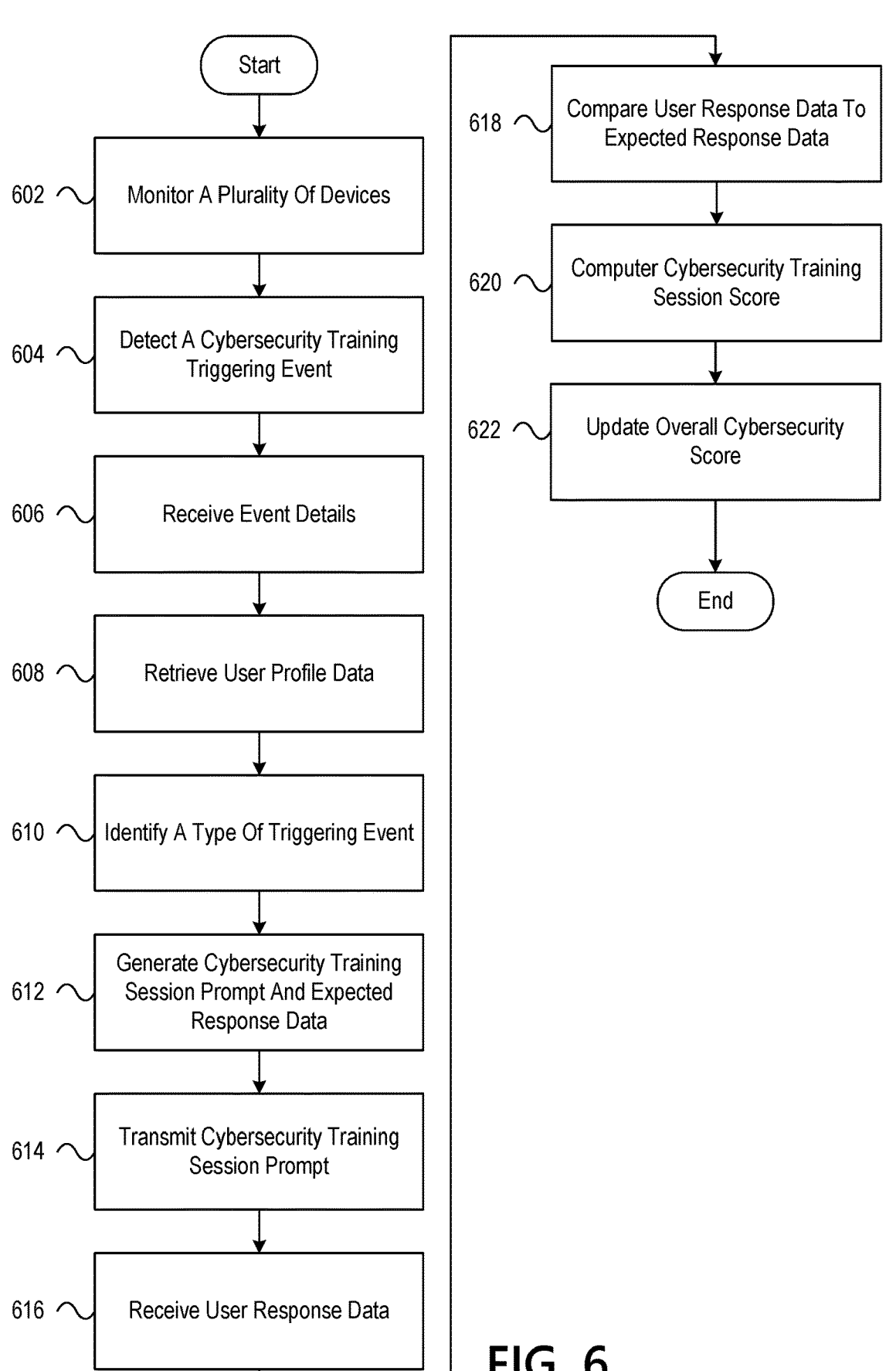
FIG. 6 depicts an illustrative method for performing dynamic cybersecurity training event detection and cybersecurity training session prompt generation actions in accordance with one or more example embodiments.

FIG. 6 depicts an illustrative method for performing dynamic cybersecurity training event detection and training session actions in accordance with one or more example embodiments. Referring to FIG. 6, at step 602, a computing platform having at least one processor, a communication interface, and memory may monitor a plurality of computing devices, such as internal enterprise user devices, to detect potential cybersecurity training triggering events. At step 604, a cybersecurity triggering event may be detected at a user device. At step 606, event details associated with the cybersecurity training triggering event may be received. At step 608, user profile data including an overall cybersecurity score for a user, as well as user characteristics, may be retrieved by the computing platform. At step 610, the computing platform may identify a type of triggering event based on the event details. At step 612, based on the type of triggering event and/or the user profile data, the computing platform may generate a cybersecurity training session prompt, as well as expected response data. At step 614, the generated cybersecurity training session prompt may be transmitted from the computing platform to the internal enterprise user device at which the triggering event was detected. At step 616, user response data including user input provided via the cybersecurity training session prompt may be received. At step 618, the user response data may be compared to the expected response data to determine whether there is a match. At step 620, the computing platform may compute a cybersecurity training session score based on the comparison. At step 622, the overall cybersecurity score for the user may be updated based on the computing cybersecurity training session score.

Accordingly, as discussed herein, aspects described provide dynamic, targeted cybersecurity training for a plurality of users. By detecting cybersecurity training triggering events in real-time or near real-time (e.g., as a user is interacting with his or her computing device during the course of the day), appropriate training may be provided in a timely manner.

For instance, as discussed herein, as a user performs various functions via a user computing device throughout a day (e.g., in the course of his or her job) the device may be monitored to detect any cybersecurity training triggering events and generate one or more cybersecurity training session prompts in response to the detected triggering event. In some examples, the cybersecurity training session prompt may be generated based on details associated with the triggering event. The questions associated with the cybersecurity training session prompt may be newly generated, selected from a list of pre-generated questions, may be extracted from larger training programs, and the like.

In some examples, the cybersecurity training session prompt may be generated based on previously identified cybersecurity threats. For instance, a request to open an email message or access a URL that was previously identified as potentially malicious may cause generation of a cybersecurity training session prompt having content targeted to an event of this type (e.g., malicious emails, best practices for using email, avoiding phishing scams, caution when accessing websites, or the like). In some examples, the data identifying the email may be received from another application, system, tool, or the like.

In some instances, content of a cybersecurity training session prompt may be related to a type of data being accessed. For instance, a user may attempt to login to a customer database having personally identifying information for a plurality of users. This may be detected as a cybersecurity training triggering event and may provide cybersecurity training for login security (e.g., password best practices) and/or customer data security. Accordingly, the generated cybersecurity training session may be related to the action being requested by the user and/or content of a system or application being accessed. Additionally or alternatively, content of one or more cybersecurity training session prompts may be based on threats to various customers of the enterprise (e.g., to provide customer-specific training or training raising awareness of customer concerns), threats to the enterprise organization, and/or best practices for operating in a connected environment.

Additionally or alternatively, cybersecurity training session prompts may be generated at predetermined intervals (e.g., once per day, once per week), or upon every (or a predetermined number of) events (e.g., at every login to a user device, at every third opening of a particular application, or the like). Along with the cybersecurity training triggering events discussed above, one or more cybersecurity training session prompts may be generated in response to detection of a new user (e.g., new employee, existing employee who has moved into a new job or role, or the like). In some arrangements, a user may be presented with cybersecurity training session prompts for a predetermined time period (e.g., first two weeks, first three months, or the like) and/or for a predetermined number of events (e.g., first five login attempts to a VPN, first 25 requests to open an email application, or the like).

In some arrangements, the content of cybersecurity training session prompts and/or frequency of generation of the cybersecurity training session prompts may be modified based on current or recently observed cybersecurity risks. For instance, if a certain cybersecurity attack or type of cybersecurity attack as recently occurred or is occurring, the computing platform may generate one or more cybersecurity training session prompts related to the cybersecurity attack or type of attack. In some examples, the generated cybersecurity training session prompt may be proactively transmitted to one or more user devices (e.g., without detecting a triggering event at a particular user device).

In some examples, cybersecurity training session prompts may be generated and transmitted to users within a group (e.g., business unit, department, or the like). Accordingly, if a cybersecurity training triggering event is detected at a first user device, in some arrangements, a cybersecurity training session prompt may be generated and transmitted to all users within the group. This may enable consistent training for all users within a designated group. Further, particular cybersecurity training session prompts may be transmitted to other users performing similar roles, having similar levels of access, or the like, even if not in a predetermined group or unit within the enterprise.

Although various aspects discussed herein are related to cybersecurity training, aspects described may be used to provide training in other areas of interest. For instance, dynamic, interactive targeted training for areas such as privacy, human resources, new job functions, harassment prevention, and the like may be provided according to one or more arrangements described herein.

The analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:

monitor a plurality of user devices associated with an enterprise organization, monitoring the plurality of user devices associated with the enterprise organization including monitoring actions requested by a user and executed by a respective user device of the plurality of user devices in performing various job functions of the user associated with the user device;

detect, in real-time, a first cybersecurity training triggering event at a first user device of the plurality of user devices of the enterprise organization, the first cybersecurity training triggering event including a plurality of event details and being detected in performance of the job functions of a first user;

detect, in real-time, a second cybersecurity training triggering event at a second user device of the plurality of user devices of the enterprise organization, the second cybersecurity training triggering event including a plurality of event details and being detected in performance of the job functions of a second user;

process, in parallel, the detected first cybersecurity training triggering event and the detected second cybersecurity training triggering event, wherein processing the detected first cybersecurity training triggering event and the detected second cybersecurity training triggering event includes, for each detected cybersecurity training triggering event:

receive event details of a respective cybersecurity training triggering event;

retrieve user profile data, the user profile data for a respective user associated with the respective cybersecurity training triggering event and including an overall cybersecurity score of the respective user and one or more user characteristics;

analyze the respective cybersecurity training triggering event and event details to identify a type of cybersecurity training triggering event;

generate, based on the identified type of cybersecurity training triggering event and the user profile, a cybersecurity training session prompt and expected response data, wherein the cybersecurity training session prompt includes one or more user interfaces including identification of the cybersecurity training triggering event detected in performance of the job functions of a respective user, and one or more questions generated based on the cybersecurity triggering event and specific to the cybersecurity triggering event and one or more user characteristics from the user profile;

transmit, via the communication interface, the generated cybersecurity training session prompt to the respective user device associated with the respective user, wherein transmitting the generated cybersecurity training session prompt to the respective user device causes the respective user device to execute the generated cybersecurity training session prompt and wherein executing the cybersecurity training session prompt causes display of the one or more user interfaces associated with the cybersecurity training session prompt by a display of the respective user device;

receive, from the respective user device via the one or more user interfaces associated with the cybersecurity training session prompt and in response to execution of the cybersecurity training session prompt, user response data received via the generated cybersecurity training session prompt;

compare the received user response data to the expected response data to determine whether the received user response data matches the expected response data;

compute, based on the comparing, a cybersecurity training session score associated with an outcome of the comparison, wherein computing the cybersecurity training session score includes applying a weight value to a baseline value associated with the comparison, and wherein the weight value is selected based on a role of the respective user within the enterprise organization;

update, based on the cybersecurity training session score of the outcome of the comparison, the overall cybersecurity score of the respective user associated with the respective user device;

in response to computing the cybersecurity training session score, identify, based on the computed cybersecurity training session score, a plurality of modifications to access permissions, wherein the plurality of modifications to access permissions includes at least one modification related to the detected respective cybersecurity training triggering event and at least one modification not related to the detected respective cybersecurity training triggering event; and transmit the modification to the access permissions to the respective user device, wherein transmitting the modification to the access permissions to the respective user device causes the respective user device to execute the modifications and modify the access permissions.

2. The computing platform of claim 1, wherein at least one of:

the first cybersecurity training triggering event or the second cybersecurity training triggering event includes at least one of: launch of an application, password reset request, or login to a virtual private network.

3. The computing platform of claim 1, wherein the cybersecurity training session prompt includes at least one targeted question generated based on the type of cybersecurity training triggering event.

4. The computing platform of claim 1, further including instructions that, when executed by the at least one processor, cause the computing platform to:

compare the cybersecurity training session score associated with the outcome of the comparison to a plurality of scoring thresholds; and identify, based on the comparing the cybersecurity training session score associated with the outcome of the comparison to plurality of scoring thresholds, additional cybersecurity training session prompts.

5. The computing platform of claim 4, wherein the plurality of scoring thresholds are specific to the respective user and are selected based on the access permissions of the respective user.

6. The computing platform of claim 1, wherein the one or more user interfaces include at least one field to receive user input in response to the cybersecurity training session prompt.

7. The computing platform of claim 1, further including instructions that, when executed, cause the computing platform to:

identify, based on the cybersecurity training session score, one or more modifications to at least one of: an application or a system; and cause execution of the one or more modifications.

8. The computing platform of claim 7, wherein the one or more user characteristics include a job function of the user, and wherein the one or more modifications are further based on the job function.

9. The computing platform of claim 1, further including instructions that, when executed, cause the computing platform to:

identify, based on the updated overall cybersecurity score, one or more modifications to at least one of: an application and a system; and cause execution of the one or more modifications to the at least one of: the application and the system.

10. The computing platform of claim 9, wherein the one or more user characteristics include a job function of the user, and wherein the one or more modifications are further based on the job function.

11. The computing platform of claim 1, wherein at least one of:

the first cybersecurity training triggering event or the second cybersecurity training triggering event includes a first login attempt by the user to one of: the user device or an application.

12. The computing platform of claim 1, further including instructions that, when executed, cause the computing platform to:

transmit the modification to the access permissions to a system of the enterprise organization, wherein transmitting the modification to the access permissions to the system of the enterprise organization causes the system of the enterprise organization to execute the modifications and modify the access permissions.

13. The computing platform of claim 1, wherein the user response data includes a request to cancel the cybersecurity training session prompt, and further including instructions that, when executed, cause the computing platform to:

generate a subsequent cybersecurity training session prompt to be transmitted to and displayed by the respective user computing device at time later than a current time.

14. The computing platform of claim 1, wherein the weight value is further selected based on one or more of: a risk level associated with the first cybersecurity training triggering event or the detected second cybersecurity training triggering event or accessibility permissions of the respective user.

15. The computing platform of claim 1, wherein determining whether the received user response data matches the expected response data comprises:

determining that the user response data is not an exact match with the expected response data, determining that at least a threshold number of characters of the user response data match characters of the expected response data, and determining that the received user response data matches the expected response data based on the threshold number of characters matching.

16. A method, comprising:

at a computing platform comprising at least one processor, a communication interface, and memory:

monitoring a plurality of user devices associated with an enterprise organization, monitoring the plurality of user devices associated with the enterprise organization including monitoring actions requested by a user and executed by a respective user device of the plurality of user devices in performing various job functions of the user associated with the user device;

detecting, in real-time, a first cybersecurity training triggering event at a first user device of the plurality of user devices of the enterprise organization, the first cybersecurity training triggering event including a plurality of event details and being detected in performance of the job functions of a first user;

detecting, in real-time, a second cybersecurity training triggering event at a second user device of the plurality of user devices of the enterprise organization, the second cybersecurity training triggering event including a plurality of event details and being detected in performance of the job functions of a second user;

processing, in parallel, the detected first cybersecurity training triggering event and the detected second cybersecurity training triggering event, wherein processing the detected first cybersecurity training triggering event and the detected second cybersecurity training triggering event includes, for each detected cybersecurity training triggering event:

receiving event details of a respective cybersecurity training triggering event;

retrieving user profile data, the user profile data for a respective user associated with the respective cybersecurity training triggering event and including an overall cybersecurity score of the respective user and one or more user characteristics;

analyzing the respective cybersecurity training triggering event and event details to identify a type of cybersecurity training triggering event;

generating, based on the identified type of cybersecurity training triggering event and the user profile, a cybersecurity training session prompt and expected response data, wherein the cybersecurity training session prompt includes one or more user interfaces including identification of the cybersecurity training triggering event detected in performance of the job functions of a respective user and one or more questions generated based on the cybersecurity triggering event and specific to the cybersecurity triggering event, and one or more user characteristics from the user profile;

transmitting, via the communication interface, the generated cybersecurity training session prompt to the respective user device associated with the respective user, wherein transmitting the generated cybersecurity training session prompt to the respective user device causes the respective user device to execute the generated cybersecurity training session prompt and wherein executing the cybersecurity training session prompt causes display of one or more user interfaces associated with the cybersecurity training session prompt by a display of the respective user device;

receiving, from the respective user device via the one or more user interfaces associated with the cybersecurity training session prompt and in response to execution of the cybersecurity training session prompt, user response data received via the generated cybersecurity training session prompt;

comparing the received user response data to the expected response data to determine whether the received user response data matches the expected response data;

computing, based on the comparing, a cybersecurity training session score associated with an outcome of the comparison, wherein computing the cybersecurity training session score includes applying a weight value to a baseline value associated with the comparison, and wherein the weight value is selected based on a role of the respective user within the enterprise organization;

updating, based on the cybersecurity training session score of the outcome of the comparison, the overall cybersecurity score of the respective user associated with the respective user device;

in response to computing the cybersecurity training session score, identifying, based on the computed cybersecurity training session score, a plurality of modifications to access permissions, wherein the plurality of modifications to access permissions includes at least one modification related to the detected respective cybersecurity training triggering event and at least one modification not related to the detected respective cybersecurity training triggering event; and transmitting the modification to the access permissions to the respective user device, wherein transmitting the modification to the access permissions to the respective user device causes the respective user device to execute the modifications and modify the access permissions.

17. The method of claim 16, wherein at least one of: the first cybersecurity training triggering event or the second cybersecurity training triggering event includes at least one of: launch of an application, password reset request, or login to a virtual private network.

18. The method of claim 16, wherein the cybersecurity training session prompt includes at least one targeted question generated based on the type of cybersecurity training triggering event.

19. The method of claim 16, further including:

comparing the cybersecurity training session score associated with the outcome of the comparison to a plurality of scoring thresholds; and identifying, based on the comparing the cybersecurity training session score associated with the outcome of the comparison to plurality of scoring thresholds, additional cybersecurity training session prompts.

20. One or more non-transitory computer-readable media storing instructions that, when executed by a computing platform comprising at least one processor, a communication interface, and memory, cause the computing platform to:

monitor a plurality of user devices associated with an enterprise organization, monitoring the plurality of user devices associated with the enterprise organization including monitoring actions requested by a user and executed by a respective user device of the plurality of user devices in performing various job functions of the user associated with the user device;

detect, in real-time, a first cybersecurity training triggering event at a first user device of the plurality of user devices of the enterprise organization, the first cybersecurity training triggering event including a plurality of event details and being detected in performance of the job functions of a first user;

detect, in real-time, a second cybersecurity training triggering event at a second user device of the plurality of user devices of the enterprise organization, the second cybersecurity training triggering event including a plurality of event details and being detected in performance of the job functions of a second user;

process, in parallel, the detected first cybersecurity training triggering event and the detected second cybersecurity training triggering event, wherein processing the detected first cybersecurity training triggering event and the detected second cybersecurity training triggering event includes, for each detected cybersecurity training triggering event:

receive event details of a respective cybersecurity training triggering event;

retrieve user profile data, the user profile data for a respective user associated with the respective cybersecurity training triggering event and including an overall cybersecurity score of the respective user and one or more user characteristics;

analyze the respective cybersecurity training triggering event and event details to identify a type of cybersecurity training triggering event;

generate, based on the identified type of cybersecurity training triggering event and the user profile, a cybersecurity training session prompt and expected response data, wherein the cybersecurity training session prompt includes one or more user interfaces including identification of the cybersecurity training triggering event detected in performance of the job functions of a respective user, and one or more questions generated based on the cybersecurity triggering event and specific to the cybersecurity triggering event and one or more user characteristics from the user profile;

transmit, via the communication interface, the generated cybersecurity training session prompt to the respective user device associated with the respective user, wherein transmitting the generated cybersecurity training session prompt to the respective user device causes the respective user device to execute the generated cybersecurity training session prompt and wherein executing the cybersecurity training session prompt causes display of one or more user interfaces associated with the cybersecurity training session prompt by a display of the respective user device;

receive, from the respective user device via the one or more user interfaces associated with the cybersecurity training session prompt and in response to execution of the cybersecurity training session prompt, user response data received via the generated cybersecurity training session prompt;

compare the received user response data to the expected response data to determine whether the received user response data matches the expected response data;

compute, based on the comparing, a cybersecurity training session score associated with an outcome of the comparison, wherein computing the cybersecurity training session score includes applying a weight value to a baseline value associated with the comparison, and wherein the weight value is selected based on a role of the respective user within the enterprise organization;

update, based on the cybersecurity training session score of the outcome of the comparison, the overall cybersecurity score of the respective user associated with the respective user device;

in response to computing the cybersecurity training session score, identify, based on the computed cybersecurity training session score, a plurality of modifications to access permissions, wherein the plurality of modifications to access permissions includes at least one modification related to the detected respective cybersecurity training triggering event and at least one modification not related to the detected cybersecurity training triggering event; and transmit the modification to the access permissions to the respective user device, wherein transmitting the modification to the access permissions to the respective user device causes the respective user device to execute the modifications and modify the access permissions.

21. The one or more non-transitory computer-readable media of claim 20, wherein at least one of: the first cybersecurity training triggering event or the second cybersecurity training triggering event includes at least one of: launch of an application, password reset request, or login to a virtual private network.

\* \* \* \* \*